(12) United States Patent
Yokota et al.

(10) Patent No.: US 7,681,753 B2
(45) Date of Patent: Mar. 23, 2010

(54) HYBRID HYDROGEN STORAGE CONTAINER AND METHOD OF STORING HYDROGEN IN CONTAINER

(75) Inventors: Tomoyuki Yokota, Tokyo (JP); Kenjiro Hamada, Tokyo (JP); Hidekazu Tsuruta, Tokyo (JP); Nobuhiro Kuriyama, Osaka (JP); Hiroyuki Takeshita, Osaka (JP); Nobuhiko Takeichi, Osaka (JP); Toshio Takano, Kanagawa (JP)

(73) Assignees: JFE Steel Corporation, Tokyo (JP); National Institute of Advanced Industrial Science and Technology, Tokyo (JP); JFE Container Co., Ltd, Tokyo (JP)

( * ) Notice: Subject to any disclaimer, the term of this patent is extended or adjusted under 35 U.S.C. 154(b) by 1399 days.

(21) Appl. No.: 10/501,810

(22) PCT Filed: Jan. 31, 2003

(86) PCT No.: PCT/JP03/00977

§ 371 (c)(1),
(2), (4) Date: Mar. 24, 2005

(87) PCT Pub. No.: WO03/064916

PCT Pub. Date: Aug. 7, 2003

(65) Prior Publication Data

US 2005/0166992 A1  Aug. 4, 2005

(30) Foreign Application Priority Data

Jan. 31, 2002  (JP) ............................... 2002-023273

(51) Int. Cl.
*F17C 1/00* (2006.01)
*F17C 1/02* (2006.01)

(52) U.S. Cl. ...................... 220/581; 220/586; 220/62.11
(58) Field of Classification Search ................. 220/581, 220/586, 591, 62.11
See application file for complete search history.

(56) References Cited

U.S. PATENT DOCUMENTS 4,736,779 A  4/1988  Bernauer (Continued)

FOREIGN PATENT DOCUMENTS

DE  22 44 390  5/1973

(Continued)

OTHER PUBLICATIONS

Patent Abstracts of Japan Publication No. 56-131900 Dated: Oct. 15, 1981.

(Continued)

*Primary Examiner*—Anthony Stashick
*Assistant Examiner*—Niki M Eloshway
(74) *Attorney, Agent, or Firm*—Ladas & Parry LLP

(57) ABSTRACT

A pressure container 1 composed of a reinforcing layer 2 and a liner layer 3, with a hydrogen charging pressure of 30 MPa or higher; and a hydrogen absorbing material and a carrier for holding said hydrogen absorbing material (hydrogen absorbing material portion 4) contained in the pressure container 1 are included, and a volume fraction X of the hydrogen absorbing material with $\alpha m \geqq 100$ kg/m$^3$ with respect to an internal volume of the pressure container 1 is $5(\%) \leqq X \leqq 20(\%)$, where $\alpha m$ denotes a maximum hydrogen absorption amount per unit volume of the hydrogen absorbing material (kg/m$^3$); $X = 100 \cdot Vm/Vi$ (%); Vi is an internal volume of the pressure container (L); and Vm is a volume of the hydrogen absorbing material in the pressure container (L).

4 Claims, 1 Drawing Sheet

U.S. PATENT DOCUMENTS

| | | | | |
|---|---|---|---|---|
| 5,987,895 | A | * | 11/1999 | Nishimura et al. ............ 62/46.2 |
| 6,071,644 | A | * | 6/2000 | Ikemachi et al. .......... 429/218.2 |
| 6,294,142 | B1 | * | 9/2001 | Nazri .......................... 423/275 |
| 2002/0146624 | A1 | * | 10/2002 | Goto et al. ................ 429/218.2 |

FOREIGN PATENT DOCUMENTS

| | | |
|---|---|---|
| DE | 25 50 584 | 5/1977 |
| DE | 28 55 476 | 7/1980 |
| DE | 3514500 | 5/1986 |
| DE | 38 32 269 | 5/1989 |
| DE | 19751411 | 1/1999 |
| DE | 100 22 803 | 11/2001 |
| EP | 0 753 480 | 1/1997 |
| EP | 1029195 | 4/2003 |
| GB | 2 015 142 | 9/1979 |
| JP | 56-131900 | 10/1981 |
| JP | 61-252997 | 11/1986 |
| JP | 61252997 | 11/1986 |
| JP | 2000-336444 | 12/2000 |
| JP | 2001-214206 | 8/2001 |
| JP | 2001-524653 | 12/2001 |

OTHER PUBLICATIONS

Patent Abstracts of Japan Publication No. 2001-214206 Dated: Aug. 7, 2001.

Patent Abstracts of Japan Publication No. 2000-336444 Dated: Dec. 5, 2000.

English Abstract of JP 2001-214206 dated Aug. 7, 2001.

* cited by examiner

HYBRID HYDROGEN STORAGE CONTAINER AND METHOD OF STORING HYDROGEN IN CONTAINER

TECHNICAL FIELD

The present invention relates to a hybrid-type hydrogen storage container to be used for supplying hydrogen to fuel cell powered vehicles in transportation equipment, fuel cells for decentralized power generation, and the like, and to a method of storing hydrogen in such a container.

BACKGROUND ART

A fuel cell, which generates power by reacting hydrogen with oxygen in air, is required to be supplied with hydrogen as an energy source. The supply of hydrogen to fuel cell equipment can be implemented by several methods as follows:

(a) supplying hydrogen by reforming town gas, LPG, or the like into hydrogen in the vicinity of consumption equipment;

(b) supplying hydrogen directly through a pipeline; and (c) supplying hydrogen by installing a hydrogen storage container in the vicinity of consumption equipment. In the mean time, various hydrogen supplying methods are studied so as to suit a scale of equipment, intended use, or the like. In particular, fuel cell powered vehicles, in which strict restrictions are posed in terms of space and weight, require a hydrogen storage container that is light-weight and small in volume, as means for supplying hydrogen to fuel cells.

Hydrogen can be supplied to hydrogen consuming equipment such as a fuel cell by using the following types of container:

(1) high-pressure hydrogen storage container;
(2) hydrogen absorbing material container; and
(3) liquid hydrogen storage container.

However, the high-pressure hydrogen storage container as mentioned in (1) provides only a small hydrogen storage amount per volume of the container, requiring a larger volume of the container to store a required amount of hydrogen, and thus is not suitable for use in fuel cell powered vehicles or the like.

As for the hydrogen absorbing material container mentioned in (2) above, a hydrogen absorbing alloy is typically used as a medium. However, since a hydrogen storage amount per weight of the container is small, a problem is posed that the weight of the container becomes remarkably heavy.

Actually, according to the recognition of current situation regarding "the hydrogen energy storage technology such as hydrogen storage devices" of the strategy for development of application technology of solid polymer fuel cells and hydrogen energy as found in the material for the workshop for fuel cell commercialization strategy (Aug. 8, 2001), in order to store 5 kg of hydrogen, a high-pressure hydrogen storage container (70 MPa) is expected to have a weight of 106 kg and a volume 193 L, and a hydrogen absorbing alloy container (3 wt % alloy) is expected to have a weight of 202 kg and a volume of 96 L.

In other words, with the technology currently available, a high-pressure hydrogen storage container is required to have a weight of at least 100 kg and a volume of at least 200 L for satisfying the requirement of storing 5 kg hydrogen, and a hydrogen absorbing alloy container is required to have a weight of at least 200 kg and a volume of at least 100 L. Thus, it is not possible to obtain a container that is capable of storing 5 kg hydrogen and yet has an external volume of less than 200 L and a total weight of less than 200 kg.

Further, regarding the liquid hydrogen storage container mentioned in (3) above, the heat insulation efficiency of the container is required to be high, and there is also a problem that hydrogen tends to be vaporized by heat entering from the outside during the storage and the vaporized hydrogen gas must be discharged out of the container.

Therefore, according to the conventional technology, it is difficult to obtain a light-weight and small-sized hydrogen storage container that is capable of storing hydrogen for a long period of time. In particular, it is necessary for a container for supplying hydrogen fuel to a fuel cell powered vehicle that is considered to be prospective as a low-pollution and energy-saving vehicle to reduce both the weight and volume of the container. Neither the high-pressure hydrogen storage container nor hydrogen absorbing alloy container currently available can be mounted easily on a vehicle for the reasons of space and weight. Also, with the liquid hydrogen storage container currently available, it is difficult to dispose of hydrogen vaporized by heat entering during the halt of a vehicle, and hence it is difficult to employ such a container as a hydrogen container for fuel cell powered vehicles.

A technology that is possibly capable of storing hydrogen for a long period of time with a lightweight and small-sized container is disclosed in Japanese Patent Laid-Open Publication No. Sho 61-252997 titled "Method for Optimizing Storage Capacity Based on Weight of Hydrogen Storage Container Including Hydride Producing Alloy and Hydrogen Container Optimized in Terms of Weight."

This technology aims at increasing the hydrogen storage efficiency by using high-pressure hydrogen of 100 to 300 bars (10 to 30 MPa) together with hydrogen absorbed by a hydrogen absorbing alloy. However, at a pressure level of less than 30 MPa, it is almost impossible, by using a hydrogen absorbing alloy with $\alpha m = 100$ kg/m$^3$, to obtain a container satisfying the requirements for a hydrogen storage container used for fuel cell powered vehicles, namely a container that has an external volume of less than 200 L and a total weight of less than 200 kg and is still capable of supplying 5 kg hydrogen. Further, presuming that the technology of Japanese Patent Laid-Open Publication No. Sho 61-252997 is applied to a fuel cell powered vehicle, a problem is posed that the hydrogen absorbing material, that is not fixed, will be exposed to vibration during the running of the vehicle and will be unevenly distributed in the container.

In order to obtain a hydrogen storage container satisfying the requirements for the use for fuel cell powered vehicles as mentioned above, it is necessary to provide a hybrid-type hydrogen storage container in which a high-pressure container of 30 MPa or more and a hydrogen absorbing material are employed together. However, when such a high pressure is used, there is posed a problem that, in case of an emergency, such as a collision of the vehicle, active hydrogen absorbing material powder will be dispersed widely to the external system to cause dust explosion, and the risk of inducing a secondary disaster such as a fire will be increased.

Therefore, an object of the present invention is to provide a hybrid-type hydrogen storage container that is easy to mount in a vehicle in terms of the space and weight and that is capable of functioning stably and safely during use and a method of storing hydrogen in such a container. More specifically, an object of the present invention is to provide a hybrid-type hydrogen storage container that makes it possible to charge 5 kg of hydrogen into a container with an external volume of less than 200 L and a total weight of less than 200 kg and that prevents active hydrogen absorbing material powder from being dispersed widely to the external system in case of an emergency.

DISCLOSURE OF THE INVENTION

The present inventors have ardently studied to solve the problems as mentioned above, and acquired the following findings.

It is possible to provide a hydrogen storage container capable of charging 5 kg of hydrogen into a container having an external volume of less than 200 L and a total weight of less than 200 kg, by using a hydrogen absorbing material having a certain hydrogen absorbing capacity at a pressure of 30 MPa or higher (maximum hydrogen absorption amount per unit volume of the hydrogen absorbing material, $\alpha m \geq 100$ kg/m$^3$), and adjusting the volume fraction of the hydrogen absorbing material with respect to the internal volume of the container and the pressure value during charging of hydrogen into the container.

By causing hydrogen absorbing material powder in the container to be held on a carrier, it is enabled not only to prevent the active hydrogen absorbing material powder from being dispersed widely to the external system in case of an emergency, but also to decrease the uneven distribution of the powder within the container.

Accordingly, a hybrid-type hydrogen storage container according to the present invention comprises a pressure container, a hydrogen absorbing material contained in the pressure container, and a carrier for holding the hydrogen absorbing material, wherein a volume fraction X of the hydrogen absorbing material with $\alpha m \geq 100$ kg/m$^3$, with respect to an internal volume of the pressure container is $5(\%) \leq X \leq 20(\%)$. In this regard, am denotes a maximum hydrogen absorption amount per unit volume of the hydrogen absorbing material (kg/m$^3$);

$$x = 100 \cdot Vm/Vi \, (\%);$$

Vi is an internal volume of the pressure container (L); and
Vm is a volume of the hydrogen absorbing material in the pressure container (L).

The pressure container described above is used with a hydrogen charging pressure of 30 MPa or higher. The pressure container comprises a liner layer and a reinforcing layer.

Furthermore, a method of storing hydrogen in a container according to the present invention comprises placing a carrier holding a hydrogen absorbing material with $\alpha m \geq 100$ kg/m$^3$ in a container such that a volume fraction X of the hydrogen absorbing material with respect to an internal volume of the container is $5(\%) \leq X \leq 20(\%)$, and charging hydrogen into the container at a pressure of 30 MPa or higher. In this regard, am denotes a maximum hydrogen absorption amount per unit volume of the hydrogen absorbing material (kg/m$^3$);

$$X = 100 \cdot Vm/Vi \, (\%);$$

Vi is an internal volume of the container (L); and
Vm is a volume of the hydrogen absorbing material in the container (L).

In this method, a container having a structure of at least two layers comprising a liner layer and a reinforcing layer is used.

Below, the features of the present invention will be described in terms of the operation and reasons for limiting values.

(1) The maximum hydrogen absorption amount per unit volume of the hydrogen absorbing material, am should be equal to or larger than 100 kg/m$^3$.

When $\alpha m \geq 100$ kg/m$^3$, the hydrogen absorption amount of the hydrogen absorbing material is as follows:

when the density is 4.0 g/cm$^3$, the hydrogen absorption amount $\geq 2.50$ wt %;

when the density is 5.0 g/cm$^3$, the hydrogen absorption amount $\geq 2.00$ wt %;

when the density is 6.0 g/cm$^3$, the hydrogen absorption amount $\geq 1.67$ wt %;

when the density is 7.0 g/cm$^3$, the hydrogen absorption amount $\geq 1.43$ wt %; and when the density is 8.0 g/cm$^3$, the hydrogen absorption amount $\geq 1.25$ wt %.

Even when a hydrogen absorbing material having a high hydrogen absorption amount by wt % is applied to a hydrogen storage container, a larger volume of hydrogen absorbing material will be required within the hydrogen storage container if the density is low. As a result, the volume efficiency will be poor. Therefore, the maximum hydrogen absorption amount per unit volume of the hydrogen absorbing material, am can be defined as above to ensure the substantive weight efficiency and volume efficiency for the hydrogen storage container. If am is less than 100 kg/m$^3$, it is almost impossible to charge 5 kg of hydrogen into a container having an external volume of less than 200 L and a total weight of less than 200 kg even under ideal conditions where the volume fraction of the carrier is 0% at the hydrogen pressure of 30 MPa, and therefore am should be equal to or larger than 100 kg/m$^3$.

(2) The volume fraction X of the hydrogen absorbing material with respect to the internal volume of the container should be defined as $5(\%) \leq X \leq 20(\%)$.

When the amount of the hydrogen absorbing material is increased, the volume efficiency of hydrogen storage is improved, whereas the weight efficiency is decreased. In contrast, when the amount of the hydrogen absorbing material is decreased, the weight efficiency of hydrogen storage is improved whereas the volume efficiency is decreased. Therefore, it is necessary to set an optimal volume fraction of the hydrogen absorbing material with respect to the internal volume of the container.

If the volume fraction of the hydrogen absorbing material is less than 5% under the condition of the hydrogen pressure of 30 MPa or higher, the volume efficiency will be remarkably lower and the external volume of the container will be increased. Further, the change of volume efficiency or weight efficiency of hydrogen storage caused by altering the amount of the hydrogen absorbing material is small, and the degree of freedom in designing a hydrogen storage container is significantly restricted so that the merits expected from a hybrid-type hydrogen storage container are substantially lost. In other words, it becomes impossible to provide a hydrogen storage container having an optimal weight and optimal volume by using a hydrogen absorbing material having a certain hydrogen absorbing capacity am (maximum hydrogen absorption amount per unit volume of the hydrogen absorbing material), by changing the volume fraction of the hydrogen absorbing material with respect to the internal volume of the container and the maximum pressure value during charging hydrogen into the container. Therefore, the volume fraction of the hydrogen absorbing material should be 5% or more.

On the other hand, if the volume fraction of the hydrogen absorbing material is increased, the volume efficiency of hydrogen storage is improved as mentioned above, whereas the weight efficiency is deteriorated to increase the total weight of the container. In addition, if the volume fraction of the hydrogen absorbing material exceeds 20%, the extent of improvement in volume efficiency in response to the increase of volume fraction of the hydrogen absorbing material becomes extremely small, and as a result only the cost of hydrogen absorbing material is increased and no merit is obtained. Therefore, the volume fraction of the hydrogen absorbing material should be no more than 20%.

(3) The hydrogen absorbing material is held by the carrier.

Generally, the hydrogen absorbing material is often used in powder form. As mentioned above, when the pressure becomes as high as 30 MPa or higher, there is posed a problem that, in case of an emergency such as collision of the vehicle, the active hydrogen absorbing material powder will be dispersed widely to the external system to cause dust explosion, and a risk is increased to induce a secondary disaster such as a fire or the like. By causing the hydrogen absorbing material powder to be held by the carrier, the hydrogen absorbing material powder dispersed to the external system by a rapid change of pressure can be decreased remarkably. Here, the state where "the hydrogen absorbing material is held by a carrier" means a state where the hydrogen absorbing material powder adheres to a fibrous or film-shaped carrier, a state where the hydrogen absorbing material powder is located between the carriers such that the degree of freedom is restricted, a state where the hydrogen absorbing material powder is wrapped by a porous material layer, or a state where the hydrogen absorbing material powder is held in a resin material. There is no restriction about such state and any of these states may be applicable here. In case that the hydrogen absorbing material powder is held in the resin material, however, it sometimes becomes difficult to activate the hydrogen absorbing material if the volume ratio of the carrier to the hydrogen absorbing material is large. Therefore, it is desirable that the volume ratio of the carrier to the hydrogen absorbing material be less than 30% if possible.

As stated above, it becomes possible by using the present invention to provide a hybrid-type hydrogen storage container that is easy to mount on a vehicle in terms of the space and weight, and is still capable of functioning stably and safely during use. More specifically, it is possible to provide a hybrid-type hydrogen storage container that is capable of charging 5 kg of hydrogen into the container with an external volume of less than 200 L and a total weight of less than 200 kg, and is also capable of preventing the active hydrogen absorbing material powder from being dispersed widely to the external system in case of an emergency.

BEST MODE FOR CARRYING OUT THE INVENTION

Figure 1:
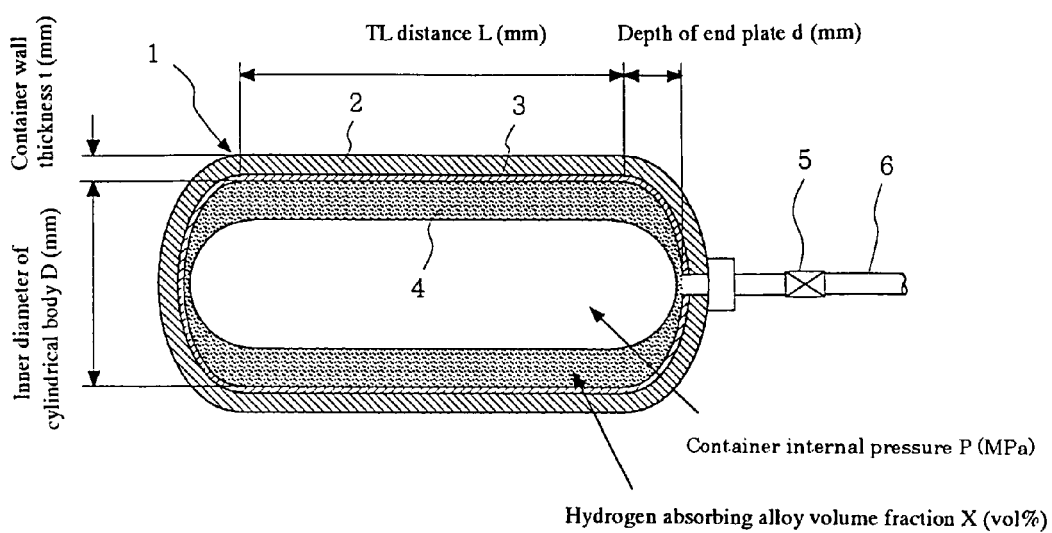
FIG. 1 is a conceptual drawing showing a hybrid-type hydrogen storage container according to the present invention.

An embodiment of the present invention will now be described with reference to the drawing. FIG. 1 is a conceptual drawing showing, in cross section, an example of a hybrid-type hydrogen storage container of the present invention. In the drawing, the reference numeral 1 denotes a pressure container that is shown in a double-layer structure consisting of a reinforcing layer 2 and a liner layer 3. A pipe 6 provided with a valve 5 is attached to the pressure container 1. A hydrogen absorbing material portion (carrier+hydrogen absorbing material) 4 representing a hydrogen absorbing material held by a carrier is contained inside the pressure container 1 and is fixed so as not to be moved by vibration during transportation or the like. Hydrogen is charged into the inside of the pressure container 1 at a charging pressure of 30 MPa or higher.

The pressure container 1 naturally needs to have adequate strength and pressure resistance, and hence should be constructed with a special care. For example, the pressure container 1 should conform to the "Technical Standards for Compressed Natural Gas Vehicle Fuel Containers." Here, as an example, the container employed has a double-layer structure in which the reinforcing layer 2 is made of FRP and the liner layer 3 is made of an aluminum alloy. The container may also have a multilayer structure composed of two or more layers. Glass fiber reinforced resin or carbon fiber reinforced resin is suitable for the reinforcing layer 2. For the liner layer 3, a metallic liner of stainless steel, for example, or a synthetic resin liner may be used instead of the liner as mentioned above.

The pressure container 1 is required to be lightweight in terms of the object of the present invention. Therefore, the density of the pressure container 1 is desirably 1.0 g/cm$^3$ or less. A pressure container having a double-layer structure consisting of a liner layer and a reinforcing layer made of materials as mentioned above is preferable since the density of such a pressure container is 1.0 g/cm$^3$ or less.

In the example as shown here, $V_{74.5}Ti_{10}Cr_{12.5}Mn_3$ is used as the hydrogen absorbing material, whereas other materials satisfying $\alpha m \geqq 100$ kg/m$^3$ may be used, such as $LaNi_5$, $Ce_{0.8}La_{0.2}Ni_{4.5}Co_{0.5}$, $Ti_{0.95}Zr_{0.05}Cr_{1.2}Mn_{0.8}$, $Ti_{34}Cr_{51}V_{15}$, and so on. The carrier for holding the hydrogen absorbing material is typically made of a synthetic resin, but the material of the carrier is not particularly limited to this. Also, it is not limited to any particular way how the hydrogen absorbing material is held by the carrier or how the carrier and the hydrogen absorbing material are arranged.

The hydrogen absorbing material portion 4, that is indicated by the shading in FIG. 1, is nothing but a schematic representation, and is modeled to facilitate the calculation of the volume fraction of a hydrogen absorbing alloy as described layer.

It can be assumed that, in an emergency such as collision of a vehicle, the pressure inside the hydrogen container drops rapidly to disperse the hydrogen absorbing material powder in the container to the external system. The following experiments were conducted to evaluate the amount of powder thus dispersed.

Five grams of hydrogen absorbing alloy as a hydrogen absorbing material was introduced, together with an alloy carrier, into a stainless steel tube of a sample container having an internal volume of 5.3cc for examining the reactivity with hydrogen. In this experiment, a method of using a fibrous polyester resin to carry the alloy or a method of holding the alloy within a polyethylene resin material were employed as an approach for holding the alloy, while a ratio of the alloy carrier volume to the alloy volume, Rj was varied in various ways. Experiments were also conducted without using an alloy carrier to provide comparative examples.

Preactivated $V_{74.5}Ti_{10}Cr_{12.5}Mn_3$ ($\alpha m$: 123.8 kg/m$^3$, powder type: 100 mesh) was used as the hydrogen absorbing alloy. $Ti_{1.2}Mn_{1.8}$ ($\alpha m$: 92.5 kg/m$^3$, power type: 100 mesh) was used as a comparative example for the hydrogen storing alloy. The $Ti_{1.2}Mn_{1.8}$ used in this case was not activated.

The reactivity with hydrogen were judged after introducing high-pressure hydrogen of 30 MPa, 35 MPa, 50 MPa, or 70 MPa at room temperature into the stainless steel container, using criteria such that the reactivity was high (double circle) when the hydrogen absorbing reaction started within 15 minutes, middle (circle) when started within one hour, and low (cross) when no reaction started.

Next, in case that the powder reacted with hydrogen, high-pressure hydrogen was again introduced into the stainless steel container, in which the pressure had been reduced by the reaction, to regain the initial hydrogen pressure (30 MPa to 70 MPa).

From this condition, the pressure within the sample container was decreased rapidly to 0.1 MPa at an average pressure decreasing speed of 10 MPa/s, and the weight of hydrogen absorbing alloy powder left in the stainless steel container was measured. The percentage of the weight reduced from the initial weight of 5 g was calculated, and the resulting value was evaluated as a percentage of dispersed powder.

In the next step, it was calculated, through the following procedures, how much total weight and external volume of the container were required to store 5 kg of hydrogen by using the hydrogen absorbing alloy powder and the carrier under the above-mentioned experimental conditions. It is favorable if the total weight and external volume of the container are less than 200 kg and less than 200 L, respectively, whereas it is unfavorable if either one of the total weight and external volume exceeds the reference value. The calculation of the total weight and external volume of the container required for storing 5 kg of hydrogen was conducted according to the following procedures. Table 1 through Table 3 show constants, hydrogen compression coefficients, and variables used for the calculation.

TABLE 1

Constants Used for Calculation

| | |
|---|---|
| Expansion coefficient when absorbing hydrogen α | 1.20 |
| Alloy carrier density ρj (g/cm³) | 1.20 |
| Hydrogen temperature within container T (° C.) | 25.0 |
| Container parameters | |
| Inner diameter of cylindrical body D (mm) | 251.5 |
| TL distance L (mm) | 580.0 |
| Container internal volume Vi (L) | 34.0 |
| Depth of end plate d (mm) | 78.4 |
| Container inner length L + 2d (mm) | 736.8 |

TABLE 2

Hydrogen Compression Coefficients Used for Calculation

| Pressure (MPa) | Compression coefficient z (at 25° C.) |
|---|---|
| 1 | 1.00667 |
| 5 | 1.03114 |
| 10 | 1.06236 |
| 20 | 1.12671 |
| 30 | 1.19286 |
| 40 | 1.25981 |
| 50 | 1.32723 |
| 60 | 1.39454 |
| 70 | 1.46155 |
| 80 | 1.52813 |
| 90 | 1.59410 |
| 100 | 1.65937 |

TABLE 3

Parameter Used for Calculation

| | |
|---|---|
| Container internal pressure (MPa) | P |
| Hydrogen absorbing alloy volume distribution (%) | X |
| Hydrogen absorbing alloy | |
| Alloy density (g/cm³) | ρm |
| Hydrogen absorbing amount (wt %) | H |
| Alloy carrier volume/alloy volume | Rj |

(Procedure 1) Calculate how many kilograms of hydrogen can be placed in an existing 34 L container under certain conditions of am, X, and P.

(Procedure 2) Calculate how many 34 L containers are required to store 5 kg of hydrogen by using the proportional calculation.

In the procedure 1, the hydrogen compression coefficient, expansion amount of the hydrogen absorbing alloy, volume and weight of the alloy carrier, and increase of the external volume and weight of the container due to increase of pressure are taken into consideration. The increase of the external volume and weight of the container due to increase of pressure was calculated under the following assumptions. The container was assumed to be a container composed of FRP with an aluminum liner. The weight of the container at a pressure of 35 MPa was assumed to be 18 kg, the weight ratio of the FRP to the aluminum liner in the weight of the container was assumed to be 1:1, the thickness of the FRP to be 11 mm, and the thickness of the aluminum liner to be 3.25 mm. The weight and thickness of the FRP were assumed to be increased or decreased according to the pressure ratio to the pressure of 35 MPa. FIG. 1 illustrates particulars of various sizes of the container, container internal pressure, and so on used for the calculation.

Formulas (procedure 1)

Alloy weight $Wm$ (kg)$=\rho m \cdot Vi \cdot X/1000 = \rho m \cdot Vm$

Absorbed hydrogen amount $Hm$ (kg)$=Wm \cdot H/1000$

Compressed hydrogen amount $Hc$ (kg)$=(273.15/273.15+T) \cdot P \cdot Vi \cdot (1000-X(\alpha+R)) \cdot 2/22.4 \cdot 100 \cdot 1000 \cdot z$ Total hydrogen amount $Ht$ (kg)$=Hm+Hc$ Container weight $Ws$ (kg)$=9+9 \cdot (P/35)$ Alloy carrier volume $Vj$ (L)$=Vi \cdot X \cdot Rj/100$ Alloy carrier weight $Wj$ (kg)$=Vj \cdot \rho j$ Total container weight $Wt$ (kg)$=Ws+Wm+Hm+Hc+Wj$ Container wall thickness $t$ (mm)$=3.25+11 \cdot (P/35)$ Container external volume $Vo$ (L)$=\{0.25 \cdot \pi \cdot (D+2t)^2 \cdot L + 0.33 \cdot \pi \cdot (d+t) \cdot (D+2t)^2\}/1000000$ Using the total container weight Wt (N) and the container external volume Vo (L) of the 34 L container as found in the procedure 1, the total container weight and external volume required for storing 5 kg hydrogen were calculated according to the following formulas.

Formulas (procedure 2)

Total container weight for storing 5 kg hydrogen (kg) $=Wt \cdot 5/Ht$ (see Table 4)

Container external volume for storing 5 kg hydrogen (L)$=Vo \cdot 5/Ht$ (see Table 4)

Table 4 shows the results of the aforementioned calculations under various conditions.

TABLE 4

Example

| No | Hydrogen absorbing alloy (100 mesh) | αm (kg/m³) | How to hold the alloy | Alloy carrier volume/ alloy volume Rj | Introduction pressure P (MPa) | Reactivity with hydrogen | Dispersed powder amount (%) | Alloy volume fraction X (%) | Total container weight (kg) | Container external volume (L) | Classification of invention |
|---|---|---|---|---|---|---|---|---|---|---|---|
| 1 | $V_{74.5}Ti_{10}Cr_{12.5}Mn_3$ | 123.8 | Held by fibrous polyester | 0.5 | 30 | ◎ | 5 | 12 | 186.7 | 198.8 | Invention example |
| 2 | " | " | Held by fibrous polyester | 0.5 | 30 | ◎ | 6 | 15 | 196.1 | 183.2 | Invention example |
| 3 | " | " | Held by fibrous polyester | 0.5 | 35 | ◎ | 3 | 3 | 138.4 | 246.2 | Comparative example |
| 4 | " | " | Held in polyethylene resin material | 0.05 | 35 | ◎ | 0 | 8 | 153.0 | 198.0 | Invention example |
| 5 | " | " | Held by fibrous polyester | 0.5 | 35 | ◎ | 8 | 12 | 180.3 | 190.5 | Invention example |
| 6 | " | " | Held by fibrous polyester | 0.5 | 35 | ◎ | 9 | 18 | 199.1 | 165.5 | Invention example |
| 7 | " | " | Held by fibrous polyester | 0.5 | 35 | ◎ | 12 | 25 | 215.7 | 143.6 | Comparative example |
| 8 | " | " | Held by fibrous polyester | 0.5 | 35 | ◎ | 12 | 36 | 234.3 | 118.8 | Comparative example |
| 9 | " | " | Held in polyethylene resin material | 0.05 | 35 | ◎ | 0 | 15 | 171.8 | 169.7 | Invention example |
| 10 | " | " | Held in polyethylene resin material | 0.2 | 35 | ◎ | 0 | 15 | 177.8 | 172.1 | Invention example |
| 11 | " | " | Held in polyethylene resin material | 0.5 | 35 | ○ | 0 | 15 | 190.4 | 177.1 | Invention example |
| 12 | " | " | Held in polyethylene resin material | 0.7 | 35 | ○ | 0 | 15 | 199.2 | 180.6 | Invention example |
| 13 | " | " | Not Held | 0 | 35 | ◎ | 95 | 15 | 169.8 | 168.9 | Comparative example |
| 14 | " | " | Held by fibrous polyester | 0.5 | 50 | ◎ | 3 | 3 | 126.9 | 208.3 | Comparative example |
| 15 | " | " | Held by fibrous polyester | 0.5 | 50 | ◎ | 6 | 7 | 147.1 | 191.7 | Invention example |
| 16 | " | " | Held by fibrous polyester | 0.5 | 50 | ◎ | 10 | 15 | 179.2 | 165.4 | Invention example |
| 17 | " | " | Held by fibrous polyester | 0.5 | 50 | ◎ | 13 | 28 | 216.0 | 135.2 | Comparative example |
| 18 | " | " | Held in polyethylene resin material | 0.05 | 50 | ◎ | 0 | 15 | 161.6 | 157.5 | Invention example |
| 19 | " | " | Held by fibrous polyester | 0.5 | 70 | ◎ | 6 | 8 | 144.7 | 172.9 | Invention example |
| 20 | " | " | Held by fibrous polyester | 0.5 | 70 | ◎ | 9 | 14 | 168.7 | 160.3 | Invention example |
| 21 | $Ti_{1.2}Mn_{1.8}$ | 92.5 | Not Held | 0 | 30 | ◎ | 90 | 12 | 198.0 | 216.2 | Comparative example |
| 22 | " | " | Not Held | 0 | 30 | ◎ | 92 | 15 | 210.3 | 201.9 | Comparative example |

As the hydrogen absorbing alloy, $V_{74.5}Ti_{10}Cr_{12.5}Mn_3$ with αm of 123.8 kg/M³ was used in the samples Nos. 1 through 20, while $Ti_{1.2}Mn_{1.8}$ with αm of 92.5 kg/m³ was used in the samples Nos. 21 and 22.

The introduction pressure of 30 MPa was established in the samples Nos. 1 and 2 and the samples Nos. 21 and 22, by using $V_{74.5}Ti_{10}Cr_{12.5}Mn_3$ with αm of 123.8 kg/m³ and $Ti_{1.2}Mn_{1.8}$ with αm of 92.5 kg/m³, respectively. The prescribed conditions that the external volume was to be less than 200 L and the total weight was to be less than 200 kg were satisfied in the samples Nos. 1 and 2, whereas, in the samples 21 and 22, since αm was less than 100 kg/m³, it was not possible to charge 5 kg of hydrogen with the assumed hydrogen pressure of 30 MPa into a container with an external volume of less than 200 L and a total weight of less than 200 kg even under the ideal condition that the carrier volume fraction was 0%.

The samples Nos. 3 through 13 are examples in which the introduction pressure of 35 MPa was established by using $V_{74.5}Ti_{10}Cr_{12.5}Mn_3$ with αm of 123.8 kg/m$^3$. The samples Nos. 3 through 8 among these samples were for examining the effects of the volume fractions of the alloy. In the sample No. 3, the volume fraction of the alloy was 3% and the volume efficiency was extremely low, resulting in the external volume of the container exceeding 200 L. Further, the degree of freedom in designing the hydrogen storage container was notably restricted so that the merits to be offered by a hybrid-type hydrogen storage container were substantially lost.

In the samples Nos. 4, 5, and 6, the volume fractions of the alloy were 8%, 12% and 18%, respectively, and the conditions of the external volume of less than 200 L and the total weight of less than 200 kg were satisfied. In contrast, in the samples Nos. 7 and 8, the volume fractions of the alloy were over 20% and thus the weight efficiency was deteriorated, resulting in the total weight of the container exceeding 200 kg.

In the samples Nos. 9 through 13, the effects of methods of holding the alloy were examined with the volume fraction of the alloy fixed to 15%. In the samples Nos. 9 through 12, the alloy was held within the carrier, and these samples are examples of the present invention. In this regard, the samples Nos. 9 and 10, in which the ratios Rj of the alloy carrier volume to the alloy volume were 0.05 and 0.2, respectively, revealed very favorable reactivity with hydrogen, whereas the samples Nos. 11 and 12 in which the ratios Rj were 0.5 and 0.7, respectively, revealed slightly lower reactivity with hydrogen. The sample No. 13 is a comparative example in which no carrier was used. In this case, almost all of the alloy powder was dispersed due to a rapid decrease of pressure.

The samples Nos. 14 through 20 are examples in which the introduction pressure of 50 MPa or 70 MPa was established by using $V_{74.5}Ti_{10}Cr_{12.5}Mn_3$ with αm of 123.8 kg/m$^3$. In all these examples, the reactivity with hydrogen was favorable and the amount of dispersed powder was controlled low. However, in the samples Nos. 14 and 17, since the volume fraction of the alloy was inadequate, the external volume of the container and the total volume of the container failed to achieve the targets. It should be noted that, in these examples, the total weight of the container and the external volume of the container were basically smaller than the case of the introduction pressure being 35 MPa.

The invention claimed is:

1. A hybrid-type hydrogen storage container comprising:
   a pressure container having an external volume of less than 200L and a total weight of less than 200 kg;
   a hydrogen absorbing material contained in said pressure container; and
   a carrier for holding said hydrogen absorbing material, wherein said pressure container is charged with at least 5 kg of hydrogen by using pressure of 30 MPa or higher, a volume fraction X of said hydrogen absorbing material with $αm \geq 100$ kg/m$^3$ with respect to an internal volume of said pressure container is 5 (%)$\leq X \leq 20$(%),
   where αm denotes a maximum hydrogen absorption amount per unit volume of the hydrogen absorbing material (kg/m$^3$);

$X = 100$ Vm/Vi (%);

Vi is an internal volume of the pressure container (L); and
   Vm is a volume of the hydrogen absorbing material in the pressure container (L).

2. The hybrid-type hydrogen storage container according to claim 1, wherein said pressure container comprises a liner layer and a reinforcing layer.

3. A method of storing hydrogen in a container comprising:
   placing a carrier holding a hydrogen absorbing material with $αm \geq 100$ kg/m$^3$ in a container having an external volume of less than 200L and a total weight of less than 200 kg such that a volume fraction X of said hydrogen absorbing material with respect to an internal volume of the container is 5 (%)$\leq X \geq 20$(%);
   and charging at least 5 kg of hydrogen into said container at a pressure of 30 MPa or higher,
   where αm denotes a maximum hydrogen absorption amount per unit volume of the hydrogen absorbing material (kg/m$^3$);

$X = 100$ Vm/Vi (%);

Vi is an internal volume of the container (L); and
   Vm is a volume of the hydrogen absorbing material in the container (L).

4. The method of storing hydrogen in a container according to claim 3, wherein the container having a structure of at least two layers comprises a liner layer and a reinforcing layer.

* * * * *